United States Patent
Znamenskiy et al.

(10) Patent No.: US 9,119,263 B2
(45) Date of Patent: Aug. 25, 2015

(54) MULTI-ZONE LIGHT CONTROLLER

(75) Inventors: Dmitry Nikolayevich Znamenskiy, Eindhoven (NL); Anteneh Alemu Abbo, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/006,452

(22) PCT Filed: Mar. 19, 2012

(86) PCT No.: PCT/IB2012/051311
§ 371 (c)(1),
(2), (4) Date: Sep. 20, 2013

(87) PCT Pub. No.: WO2012/127408
PCT Pub. Date: Sep. 27, 2012

(65) Prior Publication Data
US 2014/0009069 A1    Jan. 9, 2014

(30) Foreign Application Priority Data

Mar. 24, 2011  (EP) ..................................... 11159499

(51) Int. Cl.
*H05B 37/02* (2006.01)
*H05B 39/04* (2006.01)
(Continued)

(52) U.S. Cl.
CPC ........ *H05B 33/0854* (2013.01); *H05B 37/0227* (2013.01); *H05B 37/0245* (2013.01); *H05B 37/0272* (2013.01)

(58) Field of Classification Search
None
See application file for complete search history.

(56) References Cited

U.S. PATENT DOCUMENTS 6,486,778 B2 * 11/2002 Mahler et al. ................. 340/567
2003/0222588 A1  12/2003 Myron et al.
(Continued)

FOREIGN PATENT DOCUMENTS

CN          101541123 A     9/2009
WO          2010004514 A1   1/2010
(Continued)

OTHER PUBLICATIONS

Michele Magno et al; "Multi-Modal Video Surveillance Aided by Pyroelectric Infrared Sensors", Workshop on Multi-Camera and Multi-Modal Sensor Fusion Algorithms and Applications, M2SFA2, 2008, pp. 1-12.

*Primary Examiner* — Jany Richardson
(74) *Attorney, Agent, or Firm* — Meenakshy Chakravorty

(57) ABSTRACT

The present invention relates to a light controller (102) configured to control a lighting system (100) for emitting light, comprising an image sensor (202) configured to capture an image of an activity area, and a control unit (200) configured to received the image, to detecting movement within the activity area, and to provide an activation signal for switching on a light source (104, 106, 108, 110) of the lighting system (100), wherein the control unit (200) is further configured to provide a deactivation signal for switching off the light source (104, 106, 108, 110) after a computed time period if no movement is detected within the activity area, the computed time period being based on a computed distance between a predetermined position within the activity area and a position of the latest detected movement within the activity area. The present invention provides advantages in relation to e.g. optimized "on time" of the light source of the lighting system thereby providing an improvement in relation to the total energy consumption of the lighting system.

11 Claims, 2 Drawing Sheets

(51) Int. Cl.
  *H05B 41/36* (2006.01)
  *H05B 33/08* (2006.01)

(56) References Cited

U.S. PATENT DOCUMENTS

2006/0071605 A1* 4/2006 Diederiks .................. 315/76
2008/0100438 A1   5/2008 Marrion et al.
2009/0171478 A1   7/2009 Wong
2009/0262189 A1  10/2009 Marman
2009/0310348 A1  12/2009 Laski et al.
2010/0277306 A1  11/2010 Leinen

FOREIGN PATENT DOCUMENTS

WO  2010108326 A1  9/2010
WO  2010113075 A1  10/2010

* cited by examiner

MULTI-ZONE LIGHT CONTROLLER

TECHNICAL FIELD

The present invention relates to a light controller for a lighting system, specifically in relation to a lighting system being configured to adaptively control where and during what time periods the lighting system emit light within an activity area, such as an office space. The invention also relates to a corresponding method for controlling a lighting system.

BACKGROUND OF THE INVENTION

Recently, much progress has been made in increasing the brightness of light emitting diodes (LEDs). As a result, LEDs have become sufficiently bright and inexpensive, to serve as a light source in for example illumination arrangements such as lamps with adjustable color. By mixing differently colored LEDs any number of colors can be generated, e.g. white. An adjustable color lighting system is typically constructed by using a number of primary colors, and in one example, the three primaries red, green and blue are used. The color of the generated light is determined by the LEDs that are used, as well as by the mixing ratios. To generate "white", all three LEDs have to be turned on.

By using LEDs it is possible to decrease the energy consumption, a requirement, which is well in line with the current environmental trend. For further decreasing the energy consumption of the illumination arrangement it is possible to include light sensors and presence detectors, which will detect changes in ambient lighting and approaching persons, respectively. Such additions may in turn lead to a decrease in the time the illumination arrangement is active, as well as an intensity decrease by taking into account the ambient lighting.

An example of such a lighting system is disclosed in US 2009/0310348 A1, where a plurality of spaced apart light sources are provided for illuminating a space, each of the light sources having plural solid-state lighting devices, as well as means for sensing movement of people in the space relative to locations of the light sources. In a first case where people are detected, there is provided light having a set illumination level and being of "good quality", i.e. having a relatively high CRI. Conversely, in a second case where people are not detected, light having the same set illumination level is provided but instead of "bad quality", i.e. having a relatively low CRI. By means of such a lighting system it is possible to keep a set illumination level within the space even when no people are present as well as optimizing the efficiency of light emitted by the system. This is made possible since generally light having a relatively low CRI is more energy efficient than light having a relatively high CRI.

However, even though US 2009/0310348 A1 at least in some sense decrease the energy consumption of the lighting system, in this case by making use of detection of people in the space, it may be desirable to provide further enhancements to be able to even further decrease the energy consumption within the space.

SUMMARY OF THE INVENTION

According to an aspect of the invention, an objective is at least partly met by a light controller configured to control a lighting system for emitting light, comprising an image sensor configured to capture an image of an activity area, and a control unit configured to receive the image, to detect movement within the activity area, and to provide an activation signal for switching on a light source of the lighting system, wherein the control unit is further configured to provide a deactivation signal for switching off the light source after a computed time period if no movement is detected within the activity area, the computed time period being based on a computed distance between a predetermined position within the activity area and a position of the latest detected movement within the activity area.

According to the invention it is possible to optimize the "on time" of the light source of the lighting system by computing where within the activity area motion is detected. This has the advantage that it is possible to further decrease the energy consumption of the lighting system as the time the light source of the lighting system is kept on can be minimized because the light controller "knows" where within the activity area motion is present.

Advantageously, the computed time period is increased if the computed distance between the predetermined position within the activity area and the position of the latest detected movement within the activity area decreases. Put differently, if for example a person approaches the predetermined position within the activity area, which for example may be the centre of the activity area, the time it takes before the light is turned on is increased. Accordingly, if the person sits down at his desk which preferably may be at the predefined position within the activity area, it will take a long time before it is necessary to again detect any motion before the light is turned off. Conversely, if the person is leaving the room, and thus moves away from the predetermined position, the further the person moves away from the predetermined position the shorter it takes before the light is turned off.

It should be noted that the computed distance between the predetermined position within the activity area and the position of the latest detected movement within the activity area may comprise a distribution of distances. This may accordingly make it possible to provide "fuzzy" activity areas not necessary being completely round or squared, but rather being optimized for the e.g. office space where the light controller is used. Also, this makes it possible to define portions of the activity area having different rules for computing the time period before the light is turned off.

In a preferred embodiment, the light controller further comprises a passive infrared sensor (for example integrated in a PIR-based motion detector) connected to the control unit. By also equipping the light controller with a passive infrared sensor it is possible to configure the light controller to only capture images, for example by only selectively activate the image sensor, if the passive infrared sensor detects a change in a measured infrared light radiating. Using such an approach has the advantages that the light controller may be made very energy efficient as the image sensor is only activated when the passive infrared sensor detects an actual motion within the activity area. As understood by the skilled person, the passive infrared sensor generally only provides a "digital on/off signal" when motion is detected, whereas the motion sensor may provide a more detailed view (e.g. pixilated) of the activity area.

Accordingly, in one embodiment the activity area comprises a plurality of individual activity zones each having a predetermined position therein. Thus, by making use of the (at least slightly) higher resolution of the image sensor in comparison to the passive infrared sensor, motion in each of the individual activity zones may be detected and used for controlling a possible plurality of light sources for each of the individual activity zones. This accordingly provides for the possibility to use a single light controller for controlling a light within a space, such as an office area, where a plurality of persons are moving around and working separate from each other in individual activity zones.

Preferably, the plurality of individual activity zones and a corresponding set of rules for determining a computed time period for each of the plurality of individual activity zones are defined during a learning period. As an example, each of the predefined positions within each of the individual activity zones may be determined by switching on/off the lights within that zone. Furthermore, when the image sensor is switched on, the activity during a predetermined time period (e.g. 10 seconds) may be accumulated in a temporal activity map, possibly being individual for every light source/zone.

The light controller may be provided as a separate unit, but may also be incorporated in with a light source of the lighting system or included in a socket of a light source. Also, to achieve a high energy efficiency the light source is preferably selected from a group comprising light emitting diodes (LEDs), organic light emitting diodes (OLEDs), polymeric light emitting diodes (PLEDs), inorganic LEDs, cold cathode fluorescent lamps (CCFLs), hot cathode fluorescent lamps (HCFLs), plasma lamps. As mentioned above, LEDs have much higher energy efficiency in comparison to conventional light bulbs which generally deliver at best about 6% of their electric power used in the form of light. The skilled person would appreciate that it of course would be possible to use a standard incandescent light source, such as an argon, krypton, and/or xenon light source. In an even more preferred embodiment, the light source may for example comprise a combination of at least some of red, green, blue, yellow, magenta and cyan LEDs for creating mixed color lighting. It is however also possible to use one or a plurality of white LEDs. Further combinations are also possible.

According to another aspect of the invention, there is provided a method for controlling a lighting system using a light controller, the light controller comprising an image sensor and a control unit, the method comprising the steps of capturing an image of an activity area, detecting movement within the activity area, providing an activation signal for switching on a light source of the lighting system, computing a distance between a predetermined position within the activity area and a position of the latest detected movement within the activity area, and providing a deactivation signal for switching off the light source after a computed time period if no movement is detected within the activity area, the computed time period being based on the computed distance. This aspect of the invention provides similar advantages as discussed above in relation to the previous aspects of the invention.

As discussed above, the light controller may further comprise a passive infrared sensor. Accordingly, it is also here possible to capture the image only if the passive infrared sensor detects a change in a measured infrared light radiating.

Further features of, and advantages with, the present invention will become apparent when studying the appended claims and the following description. The skilled addressee realizes that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 2:
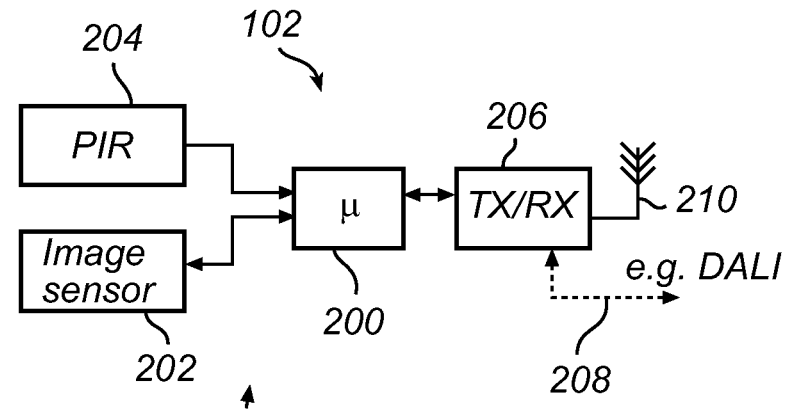
FIG. 2 illustrates a detailed view of a light controller.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1:
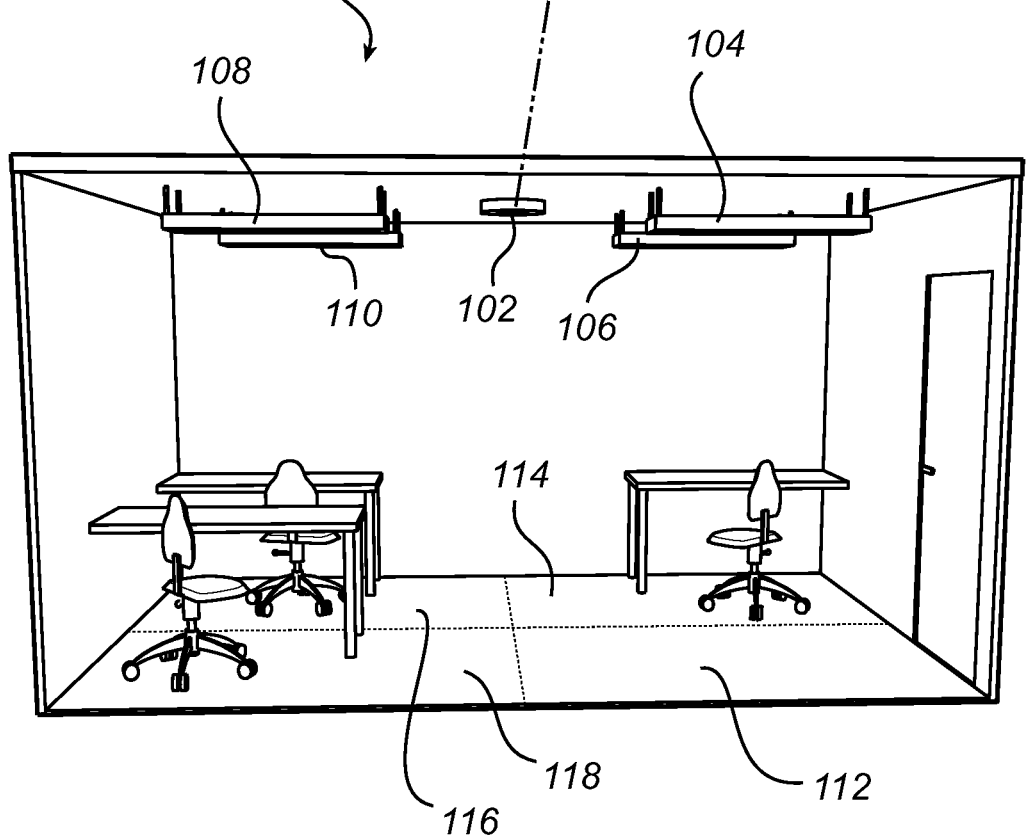
FIG. 1 illustrates a conceptual lighting system according to a currently preferred embodiment of the invention arranged in an exemplary multi-zone office space.

Referring now to the drawings and to FIGS. 1 and 2 in parallel, there is depicted a lighting system 100 according to an embodiment of the present invention. In the illustrated embodiment, the lighting system 100 comprises a light controller 102 arranged f.i. in the ceiling of an office space comprising a plurality of desks and arranged to be used by a plurality of persons. The lighting system 100 further comprises a plurality of light sources 104, 106, 108 and 110 also arranged in the ceiling of the office space and each arranged to provide a suitable amount of ambient/task illumination within a respective individual activity zone 112, 114, 116 and 118. That is, in the illustrated embodiment a single individual activity zone has a dedicated light source for providing illumination therein. Other implementations are of course possible and within the scope of the invention, such as multiple light sources associated with a single activity zone or a light source associated with two activity zones.

As discussed above, the light sources 104, 106, 108 and 110 may for example be selected from a group comprising light emitting diodes (LEDs), organic light emitting diodes (OLEDs), polymeric light emitting diodes (PLEDs), inorganic LEDs. For emission of white light, a white light emitting LED may be used, as well as a plurality of differently colored LEDs together producing white light, or for example a phosphor coated blue LED producing essentially white light.

Each of the light sources 104, 106, 108 and 110 are individually controllable by means of the light controller 102, depending on individual movement within each of the activity zones 112, 114, 116 and 118. For providing such a control functionality, the light controller 102 comprises a control unit 200 connected to an image sensor 202, for example in the form of a low resolution (e.g. VGA) CMOS sensor. The light controller 102 further comprises a PIR-based motion detector 204, including a passive infrared sensor, as well as communication circuitry 206 for allowing communication with and control of the light sources 104, 106, 108 and 110. The communication circuitry 206 may for example be connected to wired 208 and/or wireless 210 (e.g. an antenna) communication means e.g. allowing communication using standard light control communication standards such as DALI, DMX, ACM, etc.

The control unit 200 may include a microprocessor, microcontroller, programmable digital signal processor or another programmable device. The control unit 200 may also, or instead, include an application specific integrated circuit, a programmable gate array programmable array logic, a programmable logic device, or a digital signal processor. Where the control unit 200 includes a programmable device such as the microprocessor or microcontroller mentioned above, the processor may further include computer executable code that controls operation of the programmable device.

It should furthermore be noted that the light controller 102 may be battery powered (not shown) for allowing flexible positioning within the space. However, for example in a case where the light controller 102 is arranged to allow for wired 208 control of the light sources 104, 106, 108 and 110, the light controller 102 may of course be powered using the wired 208 communication means. Other configurations are of course possible and within the scope of the invention.

Figure 3:
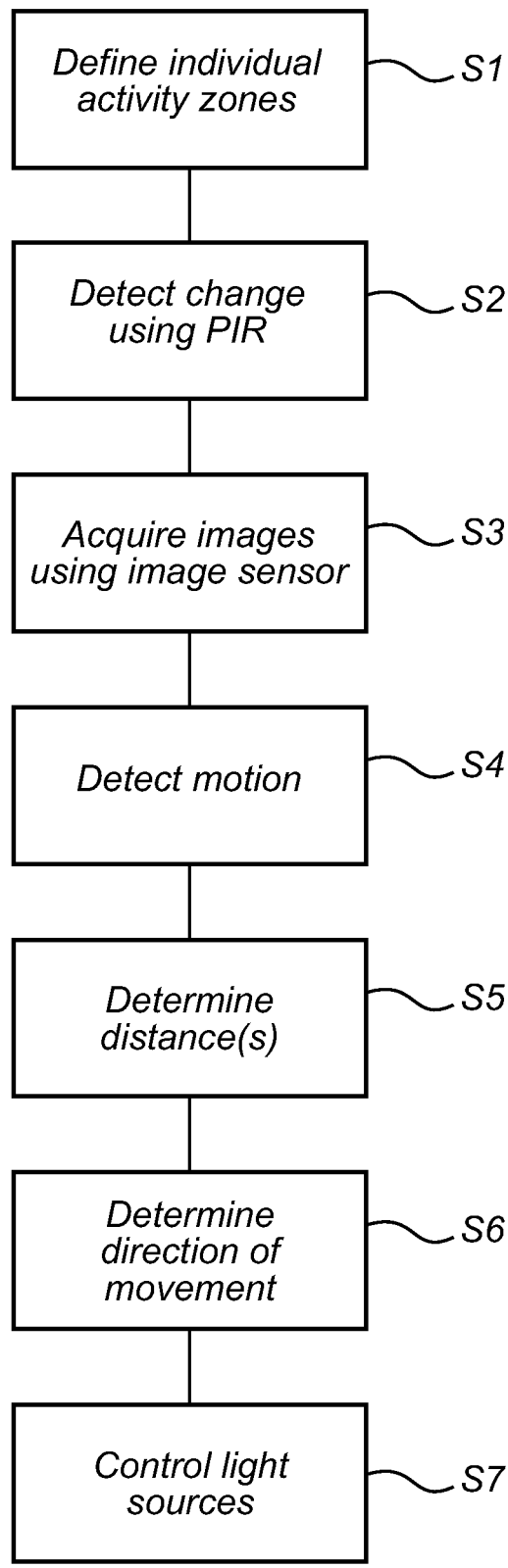
FIG. 3 illustrates a flow chart for operating the inventive method for controlling the lighting system.

During operation of the light controller and with reference also to FIG. 3, the light controller 102 is initially, S1, arranged in a "learning phase" where the respective individual activity zone 112, 114, 116 and 118 within the activity area, e.g. the office space, are defined. This may for example be done by acquiring a plurality of images using the image sensor 202, from which the local activity in the office space is detected by means of a motion detection algorithm. As an example, it would be possible to allow for the control unit 200 to store the last acquired image and then subtracts it from the next acquired image in order to get an "activity map" for the office space. The activity map may then be binarized using a locally adaptive threshold in order to reduce the dependence on the change of illumination in the office space and due to possible noise from the image sensor 202. After that the activity map may be down-scaled to a suitable resolution (e.g. 32×32 pixels) in order to reduce further computation complexity.

The activity map for the whole office space does in this case not contain any zone-specific information. Rather, zone-specific activity may be extracted from the activity map by means of zone specific activity masks for each of the individual activity zones 112, 114, 116 and 118 and possible predefined positions within each of the individual activity zones 112, 114, 116 and 118, for example being the center of each of the individual activity zones 112, 114, 116 and 118. Since the light in the individual activity zones 112, 114, 116 and 118 provided by means of the respective light sources 104, 106, 108 and 110, the sensitivity mask preferably covers the individual zone and the possible paths(s) to the entrance(s) of the office space. It should be noted that it of course may be possible to replace the individual activity masks with one single abstract activity map covering the whole office space. However, if a plurality of individual activity zones 112, 114, 116 and 118 are defined within the office space, it is still necessary to define the predetermined "center" positions for each of the individual activity zones 112, 114, 116 and 118.

It should be noted that the learning phase, S1, which as above may be automatic, of course possibly also could involve some user interaction, thus allowing it to become manual and/or semi-manual using for example a remote control (not shown). The remote control may thus be connected to the control unit 200, advantageously by means of a wireless connection, even though for example a wall mounted user interface is possible having wired connections to the control unit 200. Alternatively or also, the individual activity zones 112, 114, 116 and 118 may also be pre-programmed for a specific room geometry.

Following the learning phase, S1, the light controller 102 moves into a control phase where the light provided within each of the individual activity zone 112, 114, 116 and 118 is controlled. Accordingly, in a step S2 the PIR-based motion detector 204 detects a change in a measured infrared light radiating within the office space. Since the PIR-based motion detector 204 is inherently insensitive to changing light conditions and shadow casting from outside of the office space, e.g. through a possible window of the office space, it can robustly detect the presence of persons in the office space. However the PIR-based motion detector 204 can hardly resolve the person's location within the office space and therefore is used for activating the image sensor 202. The later can be used for resolving the occupancy of the individual activity zones 112, 114, 116 and 118 in the office space.

Again the image sensor 202 is arranged to acquire, step S3, a plurality of images of the office space, downscaling the images and performing a motion detection to detect where, step S4, within the office space motion is detected. Thereafter, step S5, the control unit 200 computes a distance between the predefined position within each of the individual activity zones 112, 114, 116 and 118 and the position where in the office space motion was detected. The distance may comprise a distribution of distances and may also be filtered using e.g. a time based averaging filter for handling fluctuations in changing detected distances.

By also computing a change in the distance between the predefined position within the individual activity zone(s) 112, 114, 116 and 118 and where motion is detected it may be possible to determine a movement direction, step S6, i.e. if a person is moving towards or away from the predefined position. Using that information it is possible to adaptively control, step S7, the light sources 104, 106, 108 and 110 to adjust the time the light is turned on within (each of) the specific individual activity zone(s) 112, 114, 116 and 118. In the disclosed embodiment, the "stay on time" determining the duration the light source(s) 104, 106, 108 and 110 are turned on when no motion is detected is reduced when the person is leaving (moving away from) the predefined position and increased when the person approaches the predefined position. Accordingly, it is possible to increase the efficiency of the lighting system 100 as the time between the moment a person leaves the office space and the moment the light is turned off can be kept to a minimum. Conversely, when a person stays close or at the predefined position the stay-on-time is kept long for providing robustness to the lighting system 100 as the light will essentially not be turned off by mistake. It should of course be noted that when motion is again detected the stay-on-time, if the light already is turned on, will again be set to an appropriate value based on where the motion is again detected.

Furthermore, it is possible to allow the determination of the computed distances within each of the individual activity zone 112, 114, 116 and 118 to relate to each other for allowing further robustness of the lighting system. For example, if one of the individual activity zones 112 is close to an entrance of the office space, specific rules may apply taking into account which states the light sources 106, 108 and 110 of the other individual activity zones 114, 116 and 118 are in. Also, detected motion "moving" from one of the individual activity zones 112, 114, 116 and 118 towards another of the individual activity zones 112, 114, 116 and 118 may be used for controlling the stay on time within each of the two zones where the motion is detected.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

Thus, in summary, the present invention relates to a light controller (102) configured to control a lighting system (100) for emitting light, comprising an image sensor (202) configured to capture an image of an activity area, and a control unit (200) configured to received the image, to detecting movement within the activity area, and to provide an activation signal for switching on a light source (104, 106, 108, 110) of the lighting system (100), wherein the control unit (200) is further configured to provide a deactivation signal for switching off the light source (104, 106, 108, 110) after a computed time period if no movement is detected within the activity area, the computed time period being based on a computed distance between a predetermined position within the activity area and a position of the latest detected movement within the activity area.

The present invention provides advantages in relation to e.g. optimized "on time" of the light source of the lighting system thereby providing an improvement in relation to the total energy consumption of the lighting system.

The invention claimed is:

1. A light controller configured to control a lighting system for emitting light, comprising:
   an image sensor configured to capture an image of an activity area; and
   a control unit configured to receive the image, to detect movement within the activity area, and to provide an activation signal for switching on a light source of the lighting system, wherein the control unit is further configured to provide a deactivation signal for switching off the light source after a computed time period if no movement is detected within the activity area, the computed time period being based on a computed distance between a predetermined position within the activity area and a position of the latest detected movement within the activity area.

2. Light controller according to claim 1, wherein the computed distance between the predetermined position within the activity area and the position of the latest detected movement within the activity area comprises a distribution of distances.

3. Light controller according to claim 1, wherein the computed time period is increased if the computed distance between the predetermined position within the activity area and the position of the latest detected movement within the activity area decreases.

4. Light controller according to claim 3, further comprising a passive infrared sensor connected to the control unit, wherein the image sensor is configured to capture the image if the passive infrared sensor detects a change in a measured infrared light radiating.

5. Light controller according to claim 4, wherein the activity area comprises a plurality of individual activity zones each having a predetermined position therein.

6. Light controller according to claim 5, further configured to control a plurality of individual light sources of the lighting system configured to emit light within each of the plurality of individual activity zones.

7. Light controller according to claim 5, wherein the plurality of individual activity zones and a corresponding set of rules for determining a computed time period for each of the plurality of individual activity zones are defined during a learning period.

8. Light controller according to claim 7, wherein the control unit is further configured to provide the predetermined position within each of the plurality of individual activity zones by determining a change in illumination when the light sources are activated and deactivated.

9. Lighting system comprising a light controller according to claim 8.

10. Method for controlling a lighting system using a light controller, the light controller comprising an image sensor and a control unit, the method comprising the steps of:
    capturing an image of an activity area;
    detecting movement within the activity area;
    providing an activation signal for switching on a light source of the lighting system;
    computing a distance between a predetermined position within the activity area and a position of the latest detected movement within the activity area; and
    providing a deactivation signal for switching off the light source after a computed time period if no movement is detected within the activity area, the computed time period being based on the computed distance.

11. Method according to claim 10, the light controller further comprising a passive infrared sensor, wherein the method further comprises the step of:
    capturing the image if the passive infrared sensor detects a change in a measured infrared light radiating.

* * * * *